United States Patent [19]

Guter

[11] 4,160,738

[45] Jul. 10, 1979

[54] WATER PURIFICATION DEVICE AND SYSTEM

[76] Inventor: Gerald A. Guter, 215 Via Socorro, San Clemente, Calif. 92672

[21] Appl. No.: 796,852

[22] Filed: May 16, 1977

[51] Int. Cl.² ............................................. B01D 27/08
[52] U.S. Cl. .............................. 210/232; 210/321 R; 210/433 M; 210/450
[58] Field of Search ............... 210/323, 433, 314, 316, 210/321 R, 456, 450, 232

[56] References Cited

U.S. PATENT DOCUMENTS

| | | | |
|---|---|---|---|
| 2,820,070 | 1/1958 | Bennett et al. | 210/433 R X |
| 3,365,061 | 1/1968 | Bray | 210/321 R |
| 3,400,825 | 9/1968 | Shippey | 210/321 R |
| 3,504,796 | 4/1970 | Bray | 210/321 R X |
| 3,542,203 | 11/1970 | Hancock | 210/321 R |
| 3,568,843 | 3/1971 | Brown | 210/321 R |
| 3,702,658 | 11/1972 | McNamara et al. | 210/321 R |
| 3,710,946 | 1/1973 | Sawyer | 210/321 R |
| 3,786,924 | 1/1974 | Hoffman | 210/321 R |
| 3,794,172 | 2/1974 | Bray | 210/321 R |
| 3,819,056 | 6/1974 | Aitken et al. | 210/321 R |

Primary Examiner—Theodore A. Granger

Attorney, Agent, or Firm—Max Geldin

[57] ABSTRACT

A water purification unit particularly adapted for household use, and for operation at high pressures, including two main co-operating parts forming a chamber, with a seal positioned between such parts, and a cap compressing the seal and holding the two parts together. The interior of the chamber can contain one or more filtering elements such as a particulate matter filter, a carbon filter or a reverse osmosis filter. To withstand high internal pressures without leakage or damage, mechanical connections are provided within the chamber to form a further positive connection between the two main parts forming the chamber, so as to maintain such filter elements in position within the chamber. A water purification system particularly suitable for household use is provided, incorporating the above unit, wherein tap water is fed to the unit and purified outlet product water is discharged and introduced drop by drop into an open container, affording an aerated storage reservoir of purified water ready for use, and including water overflow means from such container to an outlet drain, the waste water from the water purification unit being also discharged to such drain.

16 Claims, 6 Drawing Figures

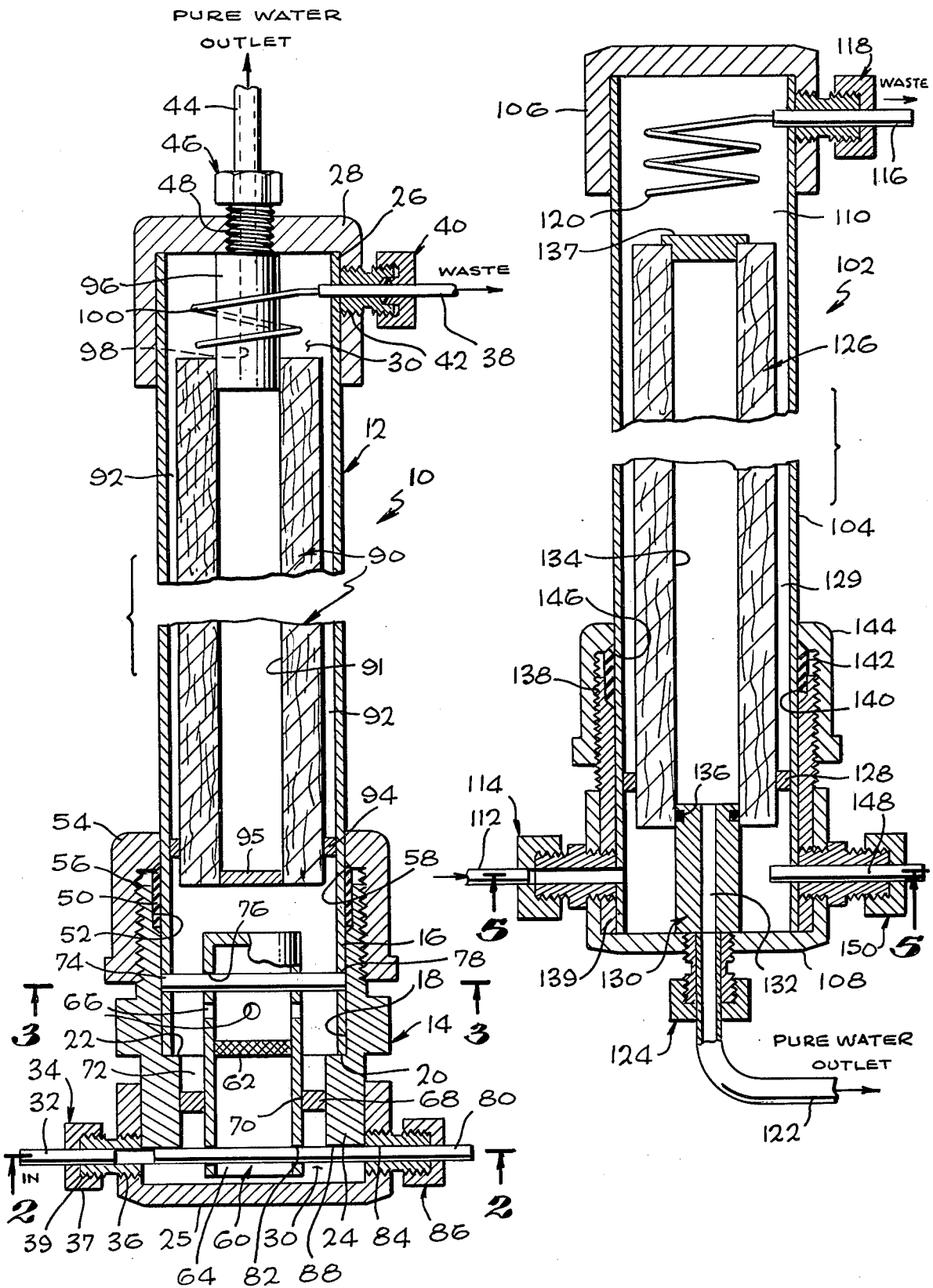

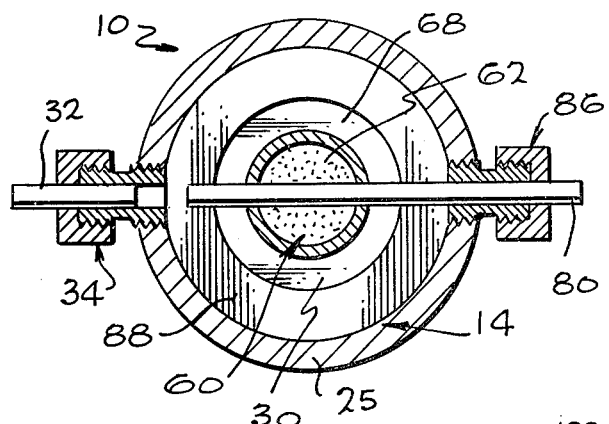
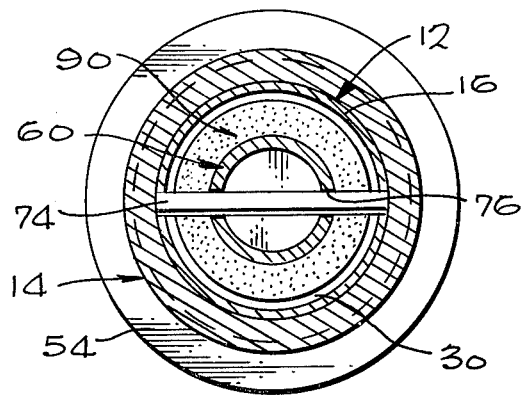
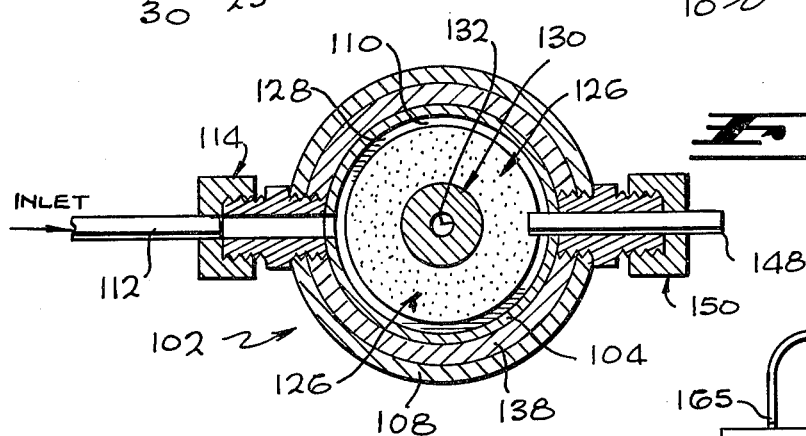
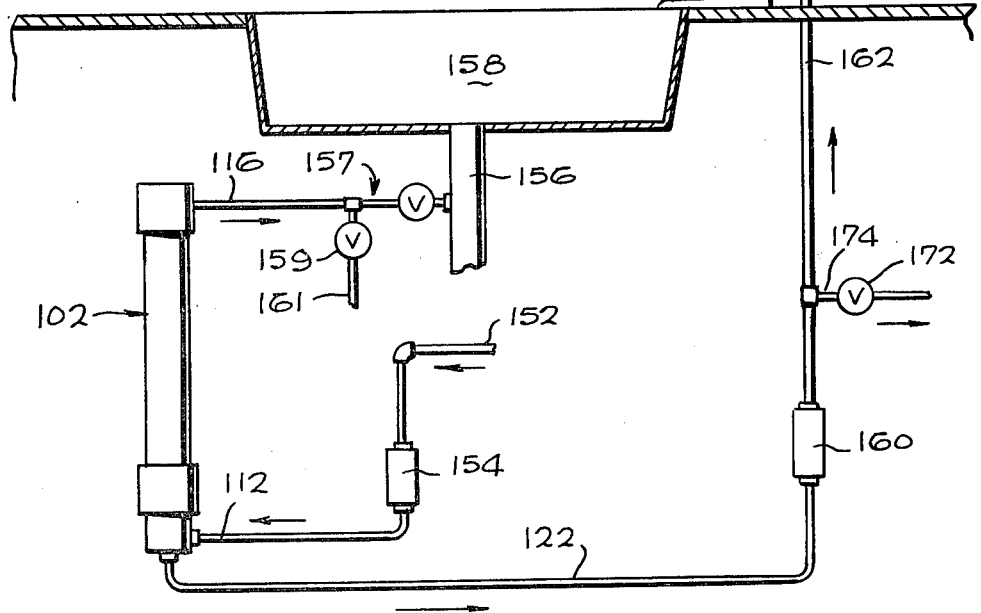

WATER PURIFICATION DEVICE AND SYSTEM

BACKGROUND OF THE INVENTION

This invention relates to an apparatus for water purification, and is particularly concerned with a water purification device and system, such device incorporating one or more filtering elements and especially designed for withstanding high internal pressures required for proper operation of the filter.

Various types of water purification devices and systems particularly designed for household use, and incorporating various filtration elements such as reverse osmosis, carbon adsorption, and other filter elements have been developed, as illustrated by U.S. Pat. Nos. 3,542,199; 3,670,892; and 3,849,305. Particularly where the water purification device employs a reverse osmosis filter, the use of pressure is required to provide proper operation of such filters and to obtain a satisfactory production rate of the pure product. Further, the pressure vessel of the purification device is frequently constructed in such a manner as to make it possible to open the vessel from time to time for cleaning and replacement of the filters which may deteriorate with time and use.

Due to the application of relatively high internal pressures in such water purification devices, leakage often occurs in the prior art devices, rendering the device inefficient and requiring replacement of parts or of the entire unit.

Further, prior art household type water purifiers and systems employ an enclosed storage or holding tank to contain the product water until demand requires the delivery of a quantity of water. Such a storage tank is often a cause for bacterial and chemical contamination of the product water because the water can become stagnant within the storage tank and dissolve substances from the tank to render the water impure. Further, prior art water purifying devices employing such storage tanks usually do not have overflow devices and the flow of water into these storage tanks ceases as the back pressure builds up and opposes and equals the pressure driving the water into the tank through the filters of such water purifying devices.

One object of the invention is the provision of a water purification device or unit, particularly adapted for household use, and having an arrangement of parts which permits the unit to operate under high internal pressures so as to provide proper operation of the filter elements contained in the device and to obtain a satisfactory or good production rate of pure product. Another object is to provide a relatively simple and inexpensive household water purification unit or device of the above type, in which the parts forming the interior chamber of the device are positively connected in tight sealing relation, and especially in conjunction with the filter elements contained therein, so that leakage from the device is avoided during high pressure operation, particularly when employing reverse osmosis filter elements. Yet another object of the invention is the provision of a water purification system, particularly designed for household use, and embodying a filtration unit or device of the above type, which operates efficiently under high internal pressures, and which incorporates an open receiver or container for receiving product water from the filtration device and permits it to be exposed to the atmosphere for aeration, with the provision of an overflow means so as to permit continuous discharge of product water from the filtration device to the open container or reservoir, the aerated product water in the container being ready for use at all times, and avoiding the stagnation of product water in unaerated closed storage containers.

BRIEF SUMMARY OF THE INVENTION

There is provided according to the invention a water purification device or unit, incorporating one or more filter elements, and having a novel arrangement of parts so that the unit will withstand high internal fluid pressures without leakage, while achieving a high production rate of pure liquid product. The invention also provides an overall water purification system incorporating the above noted unit, and which affords an open storage reservoir permitting a continuous supply of pure water without bacterial or chemical contamination often characteristic of purified water storage in closed storage tanks of the prior art.

More specifically, the objects of the invention are achieved by the provision of a water purification unit particularly adapted for household use, and for operation at high internal pressures, including at least two main cooperating parts forming a chamber, with a seal positioned between such parts, and a cap compressing the seal and holding the two parts together. One or more filtering elements are positioned within such chamber, which filter elements may include one or a combination of, for example, a reverse osmosis filter or membrane such as the well-known cellulose acetate membranes, carbon filter or a particulate matter filter.

Mechanical connections are provided within the chamber and between the two main parts to form a further positive connection between the two main parts forming the chamber in order to hold such parts in tight sealing relation at high operating pressures. Such mechanical connections also can interconnect one or more of the filter elements within the chamber, so as to maintain such filter elements in fixed position within the chamber while the fluid passes through the chamber under relatively high pressure.

The invention also affords a water purification system particularly suitable for household use which incorporates the above water purification device or unit, and wherein tap water can be fed to the unit and purified outlet product water is discharged and introduced drop by drop into an open vessel or container, affording an aerated storage reservoir of purified water ready for use, and which includes a water overflow means from such container to an outlet drain, the waste water from the water purification unit being also discharged through such drain.

Thus, the present invention provides a device which filters and purifies fluids, including ordinary tap water, and also brackish and other impure waters and renders them suitable for drinking and other purposes of consumption by humans, animals and plants. The system provides a pure product and a less pure product, the former being used for human consumption and the latter may be discarded as waste or used, for example, for irrigation purposes.

BRIEF DESCRIPTION OF THE DRAWINGS

The water purification device and system of the invention will be more readily understood by reference to the description below of certain preferred embodiments taken in connection with the accompanying drawing wherein:

FIG. 1 is a longitudinal section of one preferred embodiment of the invention filtration device;

FIG. 2 is a transverse section taken on line 2—2 of FIG. 1;

FIG. 3 is a transverse section taken on line 3—3 of FIG. 1;

FIG. 4 is a longitudinal view, shown partly in section, of another preferred embodiment of the water purification device of the invention;

FIG. 5 is a transverse section taken on line 5—5 of FIG. 4; and

FIG. 6 illustrates a water purification system according to the invention, particularly suited for household use, and incorporating the water purification unit of FIGS. 4 and 5, and wherein purified water discharged from such water purification unit is continuously fed to an open container to provide a supply of aerated water ready for use, with means for draining any overflow from the container to a sink drain.

DESCRIPTION OF PREFERRED EMBODIMENTS

Referring to FIGS. 1 to 3 of the drawing, numeral 10 represents one preferred embodiment of the water purification or filtration device of the invention which is comprised of two main parts 12 and 14, the part 12 being in the form of an elongated tube open at opposite ends, one end 16 of which is received by a tight press fit within a central bore 18 formed in the part 14, in the form of a generally cylindrically shaped hollow body member or fitting, also open at opposite ends. The outer edge 20 of the tube 12 abuts a shoulder 22 formed in the interior of the fitting 14.

The lower open end 24 of fitting 14 is closed by an end cap 25, and the opposite upper open end 26 of the tube 12 is closed by an end cap 28, such end caps being press fitted into engagement with the respective ends of fitting 14 and tube 12, preferably with the aid of an adhesive such as a polyvinyl glue, to maintain the internal pressure without leakage. Alternatively, end caps 25 and 28 can be threaded into engagement with the respective ends of fitting 14 and tube 12. Thus, the elements 12 and 14, together with end caps 25 and 28, provide an enclosed chamber 30 within the device.

The water purification or filtration device 10 is provided with an inlet 32 passing through a bulkhead fitting 34 which is threaded at 36 into the lower end of the end cap 25, the inlet thus communicating with the interior chamber 30. Such bulkhead fitting includes a nut 37 engaging an outer threaded end 39 of such fitting. A waste outlet 38 is provided at the opposite upper end of the device, such waste outlet passing through another bulkhead fitting 40 which is threaded at 42 through the end cap 28, the inner end of the waste outlet 38 passing through the wall of tube 12 also communicating with the chamber 30. A pure water outlet 44 is introduced centrally through a third bulkhead fitting 46 threaded at 48 into the center of the end cap 28, and also communicates with the chamber 30.

A gasket or seal 50 is positioned within a recess 52 in the inner upper wall of fitting 14, adjacent the open upper end thereof, such seal being disposed in tight sealing engagement with the outer periphery of the adjacent wall of tube 12 within the fitting. An internally threaded cap 54 is threadably engaged with external threads 56 around the upper end of the fitting 14, the upper end of the seal 50 being received within a recess 58 of cap 54. It is thus seen that when the closing cap 54 is screwed or threaded onto the fitting 14, cap 54 compresses the seal 50 around the circumference of tube 12 and thus holds the parts 12 and 14 together by frictional forces developed by compressing the seal against the exterior of the tube 12.

A housing 60 containing a filter 62 is positioned axially within the chamber 30 at the lower end thereof and within the fitting 14. The filter 62 is a particulate filter, that is a filter for removing particulate matter from the water, and can be formed of porous materials such as porous metal, porous plastic or fiber woven material. The filter housing 60 is open at its lower end as indicated at 64 and is provided with a plurality of holes 66 around the upper circumference of housing 60. The housing 60 can conveniently be in the form of a cylinder, the upper end of which is closed. A circular flange or plate 68 having an aperture 70 fits around the circumference of the housing 60 and is positioned in the annulus 72 between the inner wall of the fitting 14 and the outer wall of the housing 60, the plate 68 being suitably connected to the housing 60 as for example, by means of glue or a suitable adhesive. Thus, the plate 68 functions to position the filter housing 60 axially within the chamber 30 and also functions to inhibit flow past the filter housing 60 in the annulus around such filter housing.

A first rod 74 is passed transversely through aligned apertures 76 in the filter housing 60 and is connected as by a press fit at 78, or by threading into the diagonally opposite wall portions of the lower end of tube 12. A second rod 80 passes through apertures 82 in the lower end of the filter housing 60 and through an aperture 84 in the lower end of end cap 25, and is attached to such end cap by means of another bulkhead fitting 86 which is threadably attached to the end cap 25. The rod 80 abuts the lower end 88 of the fitting 14.

It is thus seen that the filter housing 60 is joined to the tubular member 30 by rod 74 and also to the fitting 14 by the rod 80, so that the parts 12 and 14 are positively connected and cannot move relative to each other. Also, it is noted that housing 60 is positively positioned axially within the chamber 30 by means of flange 68, and cannot move either laterally or longitudinally within such chamber.

A reverse osmosis filter 90 which is tubular in form, the central bore 91 of which is open at its opposite ends, is axially positioned within the outer tubular housing 12, the outer periphery of the reverse osmosis filter being smaller than the inner diameter of the tube 12, and forming an annulus 92 around the filter 90 between the filter and the inner wall of tube 12. The reverse osmosis filter can be any commercially available form of filter of this type, such as a cellulose acetate filter, e.g. as described in U.S. Pat. No. 3,344,214, to Manjikian et al. The tubular filter 90 is held in axial position within chamber 30 by means of a flange or plate 94 positioned at the lower end of filter 90 in the annulus 92 between the outer wall of tube 90 and the inner periphery of the tubular housing 12, such plate being suitably connected to tube 12 as by adhesive. A plug 95 closes the lower end of central bore 91 in filter 90 and a plug 96 having a central bore 98 has its lower end press fitted into the bore 91 at the upper end of the reverse osmosis filter 90, the upper end of plug 96 abutting and being connected to the inner surface of the end cap 28. The plug 96 is aligned with the pure product outlet 44 so that the bore 98 of plug 96 communicates with such outlet.

A flow restrictor 100 in the form of a helically shaped pipe of small internal diameter is positioned in chamber 30 around the plug 96, one end of such restrictor pipe communicating with the waste outlet 38, the inner end of such restrictor communicating with the interior chamber 30.

Now referring to another embodiment of the water purifying device of the invention shown in FIGS. 4 and 5, numeral 102 indicates the device which is comprised of an elongated tube 104 open at opposite ends, such open ends being closed by a pair of end caps 106 and 108, to form an enclosed chamber 110, end cap 106 being press fitted over one end of the tube 104.

An inlet 112 is provided which passes through a bulkhead fitting 114 in the side wall of the end cap 108 and through the wall of tube 104 into communication with the chamber 110.

At the opposite end of the tube 104 there is provided a waste outlet 116 which passes through another bulkhead fitting 118 threaded into the opposite end cap 106, and through the wall of the tube 104 into communication with the chamber 110. A helical flow restrictor pipe 120 of reduced diameter is connected at one end to the inner end of the waste outlet 116, the opposite end of restrictor 120 being in communication with the interior chamber 110. The flow restrictor 100 in FIG. 1 and 120 in FIG. 4 serve to reduce and control the liquid product flow rate and to maintain the pressure in chamber 30 and 110, respectively.

A pure water outlet 122 is provided at the lower end of the device, the outlet 122 communicating through a bulkhead fitting 124 threaded centrally into the end cap 108, with the interior chamber 110.

A reverse osmosis filter 126 in the form of a tubular member having an outer diameter smaller than the inside diameter of the outer tube 104 is positioned axially therein and held in such axial position by a flange or plate 128, the outer periphery of which is in contact with and attached to the inner wall of the tube 104, forming an annulus 129 between filter 126 and tube 104. The tubular filter 126 is positioned over and is supported on an axially positioned plug 130 which is connected at its lower end to the end cap 108, the plug 130 having a central bore 132 which communicates with the product outlet pipe 122. The upper end of the plug 130 is received within a central bore 134 of the reverse osmosis filter 126, an O-ring seal 136 being provided in a groove in the outer periphery of the plug 130 in contact with the lower inner wall of bore 134.

An externally threaded collar 138 is press fitted tightly around the outer wall of the elongated tube 104, the lower end 139 of collar 138 extending into the end cap 108. If desired, end cap 108 and collar 138 can be made into a single integral part, which is press fitted over and around the lower end portion of tube 104. Collar 138 is provided in its upper internal surface with a recess 140 which receives a circular gasket or seal 142, and an internally threaded compression sealing cap 144 provided with a recess 146 to receive the upper end of the seal 142, fits over and around the tube 104 and is threadably engaged over the collar 138 to thus compress the seal 142 around the periphery of tube 104 to aid in holding the tube 104 and associated collar 138 in tight positive engagement. A rod 148 passes through a bulkhead fitting 150 which is threadably engaged with the end cap 108 at a position diagonally opposite and in alignment with the inlet 112, the rod 148 passing through the wall of tube 104 to the interior thereof. Thus, it is seen that the rod 148 provides a positive engagement between the end cap 108 and tube 104 to aid further in holding the parts in position.

The structural components of the filter device of FIGS. 1 and 4, such as elements 12, 14, 25 and 28 in FIG. 1, and corresponding elements 104, 138, 106 and 108 in FIG. 4, can be made of any suitable material such as metal, plastics, ceramics, and the like.

In the operation of the water purification device of FIGS. 1 to 3, tap water or other impure water is introduced through inlet 32 into chamber 30 and passes into the lower end of the housing 60 through the particulate filter 62 therein to remove any solid particles or matter suspended in the water. The water then passes through the apertures 66 in the filter housing 60 into the chamber 30 and then passes into the reverse osmosis filter 90. By the process of reverse osmosis, dissolved materials including inorganics such as salts and organics such as bacteria are removed by concentrating in the solution passing through the reverse osmosis filter 90 to the annulus 92 in chamber 30, and the resulting solution is discharged from the waste outlet 38. The purified water from which the above noted organic and inorganic impurities have been removed or their concentration substantially reduced, passes from the reverse osmosis filter 90 into the bore 91 of the filter and through the bore 98 in plug 96, and is discharged as pure product liquid from outlet 44.

High internal pressures are required within the chamber 30 for proper operation of the filters 62 and 90, particularly the reverse osmosis filter 90. Thus, a water pressure greater than 10 psi, and which can range from about 20 to about 150 psi is employed in operation of this device. As result of the arrangement of rods 74 and 80 connecting and holding the main parts of the filter together, and maintaining the filter elements and filters 60, 62 and 90 in proper position within the device, in conjunction with the seal and closure cap compressing such seal, the above noted high pressures are maintained without leakage and while obtaining a satisfactory rate of product flow from the outlet 44.

In the operation of the device of FIGS. 4 and 5, tap water or other source of impure water is introduced under high pressures as noted above through the inlet 112, and into the lower portion of the chamber 110 around the plug 130 in the lower portion of the device. The water then passes through the elongated tubular reverse osmosis filter 126, the waste fluid containing a substantially increased concentration of inorganics such as salt and other impurities, collecting in the annulus 129 around the filter 126, and being removed by passage through the flow restrictor 120 and the waste outlet 116. Pure water of substantially reduced concentration of impurities such as salts, collects in the central passage or bore 132 of the reverse osmosis filter 126 and passes through the bore 132 of plug 130 into the product outlet 122 for removal. The arrangement of the rod 148 and the associated closure cap 144 and seal 142 maintain the components of the filter in tight positive engagement without leakage and while producing a satisfactory flow of pure water.

The devices of FIGS. 1 and 4 can be disassembled and opened for cleaning readily, by unscrewing cap 54 or 144, and removing the respective end caps.

Referring now to FIG. 6, there is shown a system incorporating the water purification device 102 of FIG. 4, utilizing filtration by reverse osmosis, in conjunction with particulate filtration and a carbon filter, and aeration for producing highly purified water from tap water of poor quality, for household use. Tap water from a household cold water line at 152 is first passed through a particulate matter filter, e.g. in the form of a porous media packed tube, indicated at 154, and the water discharged from the filter 154 is introduced through the line 112 into the water purification device 102. Following treatment in the water purification device 102, containing the reverse osmosis filter 126, waste material is discharged via line 116 and valve 157 to the drain 156 of a household sink 158, or can be discharged or by-passed to a storage or irrigation system (not shown) through valve 159 and line 161.

The pure product water is discharged from the outlet 122 of the device 102, and is passed through a carbon filter 160 which removes other organics not removed by reverse osmosis, and chlorine or other flavor and odor producing elements and compounds. Purified water passes through the tube 162 containing valve 163 and is discharged drop by drop from the upper end 165 of tube 162. Each drop which is so discharged absorbs oxygen, carbon dioxide and other atmospheric gases as it falls into an open container 164, forming a reservoir or open storage of pure water with natural flavor at 166 which is ready for use at any time.

The container 164 rests on a sloping base 168, and as the container fills and overflows from the overflow spout 170 onto the inclined base or shelf 168, such excess water flows into the sink 158 and the drain 156 therefrom.

If desired, valve 163 can be closed, thus forcing water in line 162 through a check valve 172 in a by-pass line 174 and into an auxiliary storage tank (not shown), and having a higher head pressure.

The system shown in FIG. 6 and described above is particularly adapted for household applications when the total output of pure water is say from 1 to 10 gallons per day. In the system described above and shown in FIG. 6, stagnation of the product water accompanied by bacterial contamination does not occur, since the storage container is open to the atmosphere and the product water is aerated as it falls into and remains in the container. Also, the system incorporates an overflow device, thus avoiding the buildup of back pressure usually encountered in closed holding or storage tanks employed in the prior art, as product water flows into such tanks, which opposes the pressure driving the water through the filters and substantially reduces the flow rate and the efficiency of the device.

When the device 10 of FIG. 1 is employed as the filtration device in the system of FIG. 6, in place of the device 102 of FIG. 4, since the device 10 includes a particulate filter 62, the external particulate filter 154 in FIG. 6 can be omitted.

From the foregoing, it is seen that the invention provides an improved water purification device, particularly designed for household use, which will withstand high internal fluid pressures without leakage while maintaining good efficiency and a high rate of product flow, and a household water purification system incorporating such device and which affords a continuous supply of pure, aerated water.

It is understood that various changes and modifications can be made in the invention device and system without departing from the spirit of the invention, and the invention accordingly is not to be taken as limited except by the scope of the appended claims.

I claim:

1. A water purification device which comprises at least two cooperating structural elements forming a housing containing an enclosed chamber, sealing means positioned between said structural elements, a cap compressing said sealing means and holding said at least two elements together, a fluid inlet to said chamber, a waste fluid outlet and a product fluid outlet from said chamber, at least one filter means positioned in said chamber, at least one additional mechanical connection maintaining said at least two structural elements in secure sealed engagement during operation under high internal fluid pressures, said at least one filter means being a tubular reverse osmosis filter, said filter constructed and arranged within said housing to provide an annulus between the outer surface of said reverse osmosis filter and the inner surface of said housing, a second sealing means within said annulus and preventing flow of inlet water through said annulus and past said second sealing means, said filter having one edge disposed in said chamber so that inlet water entering said chamber and said one edge of said filter passes through said filter and is treated therein, and pure water is discharged interiorly through said filter and waste water is discharged exteriorly of said filter in said annulus on the other side of said second sealing means from said inlet water, and forming a waste water chamber, and means closing one end of the bore of said tubular reverse osmosis filter to provide a pure water chamber separate from the inlet water introduced for purification, said product fluid outlet communicating with the other end of said bore and said pure water chamber therein, said waste fluid outlet communicating with said waste water chamber in the annulus exteriorly of said filter.

2. A water purification system comprising in combination, a water purification device according to claim 1, a cold water line, first conduit means connecting said cold water line and said inlet of said device, a sink, second conduit means connecting said waste fluid outlet of said device to the sink drain, an open container, a sloping platform mounted on a support adjacent said sink, said container resting on said sloping platform, third conduit means connecting said product fluid outlet of said device with said container, the end of said third conduit means terminating above said container to permit pure product water from said product fluid outlet to fall dropwise into said container, and permitting aeration of said product water in said container, the overflow from said container passing into said sink and said sink drain.

3. A water purification device which comprises at least two cooperating structural elements forming a housing containing an enclosed chamber, sealing means positioned between said structural elements, a cap compressing said sealing means and holding said at least two elements together, a fluid inlet to said chamber, a waste fluid outlet and a product fluid outlet from said chamber, at least one filter means positioned in said chamber, at least one additional mechanical connection maintaining said at least two structural elements in secure sealed engagement during operation under high internal fluid pressures, said at least one filter means being a tubular reverse osmosis filter, said filter mounted in said device and constructed and arranged within said housing to form an annulus between the outer surface of said filter and the inner wall of said device, a flange within said annulus preventing flow of inlet water through said annulus and past said flange, said filter having a lower edge disposed in said chamber so that inlet water entering said chamber and said lower edge of said filter passes through said filter and is treated therein, and pure water is discharged interiorly through said filter and waste water is discharged exteriorly of said filter in said annulus on the other side of said flange from said inlet water, and forming a waste water chamber, means closing one end of the bore of said tubular reverse osmosis filter to provide a pure water chamber separate from the inlet water introduced for purification, said product fluid outlet communicating with the other end of said bore and said pure water chamber therein, said waste fluid outlet communicating with said waste water chamber in the annulus exteriorly of said filter.

4. A device according to claim 3, said at least one additional mechanical connection comprising rod means interconnecting said at least two structural elements.

5. A device according to claim 3, including a second particulate filter positioned in said enclosed chamber in series with and upstream from said reverse osmosis filter, including a housing for said second filter, said at least one additional mechanical connection interconnecting said filter housing with at least one of said structural elements forming said enclosed chamber to maintain said second filter in fixed position within said last mentioned chamber during said operation under high internal pressures, and a second mechanical connection interconnecting said filter housing with another of said at least two structural elements.

6. A device according to claim 5, said mechanical connections each comprising rod means.

7. A device according to claim 1, one of said structural elements being an elongated tube, the other structural element being a hollow body member, means closing the opposite ends of said tube and said body member, said at least one additional mechanical connection interconnecting said tube and said body member.

8. A device according to claim 3, one of said structural elements being an outer tubular housing, another of said structural elements being a cooperating hollow body member, said sealing means being a seal positioned between said outer tubular housing and said hollow body member, said cap being threaded onto said body member and compressing said seal and holding said tubular housing and said body member together, end caps around the opposite open ends of said tubular housing and said hollow body member, and forming said enclosed chamber defined within said tubular housing and said hollow body member, said fluid inlet communicating with said enclosed chamber at the lower end thereof, and said waste fluid outlet communicating with said enclosed chamber within said tubular housing at the upper end thereof.

9. A device according to claim 8, said tubular reverse osmosis filter being axially positioned within and extending upwardly into said tubular housing and said enclosed chamber, said waste fluid outlet communicating with said annulus and said waste water chamber downstream from said flange, said product fluid outlet passing axially through one of said end caps adjacent the upper end of said tubular housing, a first plug received in the upper end of the bore of said tubular reverse osmosis filter, an axial bore in said plug, said product fluid outlet communicating with said bore in said plug, and said closing means comprising a second plug in the bore of said tubular reverse osmosis filter at the lower end thereof.

10. A device according to claim 9, including a second particulate filter positioned in the lower portion of said enclosed chamber upstream from said tubular reverse osmosis filter, a housing for said particulate filter, said housing being open at its lower end and in communication with said fluid inlet, said filter housing being axially positioned in said chamber, a second flange between said filter housing and said body member blocking fluid flow around said filter housing, apertures in the upper portion of said filter housing downstream from said particulate filter therein, permitting fluid flow in series from said inlet through said particulate filter and said reverse osmosis filter, said additional mechanical connections including a rod interconnecting said filter housing and said outer tubular housing and a rod interconnecting said filter housing and said body member, and passing through said other end cap around said body member, and a flow restrictor communicating said chamber above said reverse osmosis filter, with said waste fluid outlet.

11. A water purification system comprising in combination, a water purification device according to claim 10, a cold water line, first conduit means connecting said cold water line and said inlet of said device, a sink, second conduit means connecting said waste fluid outlet of said device to the sink drain, an open container, a sloping platform mounted on a support adjacent said sink, said container resting on said sloping platform, third conduit means connecting said product fluid outlet of said device with said container, the end of said third conduit means terminating above said container to permit pure product water from said product outlet to fall dropwise into said container, and permitting aeration of said product water in said container, the overflow from said container passing into said sink and said sink drain.

12. A water purification device which comprises at least two cooperating structural elements forming a main housing containing an enclosed chamber, one of said structural elements being an outer tubular housing, another of said structural elements being a cooperating hollow body member, a seal positioned between said tubular housing and said body member, a cap threaded onto said body member and compressing said seal and holding said tubular housing and said body member together, end caps around the opposite open ends of said tubular housing and said body member, and forming said enclosed chamber defined within said tubular housing and said hollow body member, said fluid inlet communicating with said enclosed chamber at the lower end thereof, and said waste fluid outlet communicating with said enclosed chamber within said tubular housing at the upper end thereof, a rod interconnecting said outer tubular housing and said body member, and maintaining said tubular housing and said body member in secure sealed engagement during operation under high internal fluid pressures, a tubular reverse osmosis filter axially positioned within and extending upwardly into said tubular housing and said enclosed chamber, said filter constructed and arranged within said tubular housing to form an annulus between the outer surface of said filter and the inner wall of said tubular housing, a flange within said annulus preventing flow of inlet water through said annulus and past said flange, said filter having a lower edge disposed in said chamber so that inlet water entering said chamber and said lower edge of said filter passes through said filter and is treated therein, and pure water is discharged interiorly through said filter and waste water is discharged exteriorly of said filter in said annulus on the other side of said flange from said inlet water, and forming a waste water chamber, said waste fluid outlet communicating with said annulus and said waste water chamber downstream from said flange, a plug closing the bore of said tubular reverse osmosis filter at the upper end thereof, to provide a pure water chamber separate from the inlet water introduced for purification, and a second plug received in the lower end of the bore of said reverse osmosis filter, said second plug having an axial bore therein, said product fluid outlet communicating with said bore in said second plug and passing through one of said end caps at the lower end of said device.

13. A water purification system comprising in combination, a water purification device according to claim 12, a cold water line, first conduit means connecting said cold water line and said inlet of said device, a sink, second conduit means connecting said waste fluid outlet of said device to the sink drain, an open container, a sloping platform mounted on a support adjacent said sink, said container resting on said sloping platform, third conduit means connecting said product fluid outlet of said device with said container, the end of said third conduit means terminating above said container to permit pure product water from said product fluid outlet to fall dropwise into said container, and permitting aeration of said product water in said container, the overflow from said container passing into said sink and said sink drain.

14. A system according to claim 13, including a carbon filter in said third conduit means.

15. A system according to claim 13, including a particulate matter filter in said first conduit means and a carbon filter in said third conduit means.

16. A water purification device which comprises at least two cooperating structural elements forming a main housing containing an enclosed chamber, one of said structural elements being an outer tubular housing, another of said structural elements being a cooperating hollow body member, a seal positioned between said tubular housing and said body member, a cap threaded onto said body member and compressing said seal and holding said tubular housing and said body member together, means enclosing the opposite open ends of said tubular housing and said body member, and forming said enclosed chamber defined within said tubular housing and said hollow body member, said fluid inlet communicating with said enclosed chamber at the lower end thereof, and said waste fluid outlet communicating with said enclosed chamber within said tubular housing at the upper end thereof, a rod interconnecting said outer tubular housing and said body member, and maintaining said tubular housing and said body member in secure sealed engagement during operation under high internal fluid pressures, a tubular reverse osmosis filter axially positioned within and extending upwardly into said tubular housing and said enclosed chamber, said filter constructed and arranged within said tubular housing to form an annulus between the outer surface of said filter and the inner wall of said tubular housing, a flange within said annulus preventing flow of inlet water through said annulus and past said flange, said filter having a lower edge disposed in said chamber so that inlet water entering said chamber and said lower edge of said filter passes through said filter and is treated therein, and pure water is discharged interiorly through said filter and waste water is discharged exteriorly of said filter in said annulus on the other side of said flange from said inlet water, and forming a waste water chamber, said waste fluid outlet communicating with said annulus and said waste water chamber downstream from said flange, means closing the upper end of the bore of said tubular reverse osmosis filter to provide a pure water chamber separate from the inlet water introduced for purification, and means communicating said product fluid outlet with the lower end of the bore of said tubular reverse osmosis filter, said product fluid outlet passing through the lower end of said device.

* * * * *